Jan. 13, 1931.  J. S. DA COSTA  1,788,454
CONVEYING CHAIN
Filed Nov. 27, 1928  2 Sheets-Sheet 1

INVENTOR.
JAMES S. DA COSTA,
BY Shepherd & Campbell
ATTORNEYS

Jan. 13, 1931.    J. S. DA COSTA    1,788,454
CONVEYING CHAIN
Filed Nov. 27, 1928    2 Sheets-Sheet 2

INVENTOR.
JAMES S. DA COSTA,
BY Shepherd Campbell
ATTORNEYS.

Patented Jan. 13, 1931

1,788,454

UNITED STATES PATENT OFFICE

JAMES S. DA COSTA, OF MERCHANTVILLE, NEW JERSEY, ASSIGNOR OF ONE-HALF TO JERVIS B. WEBB, OF VINSETTA PARK, MICHIGAN

CONVEYING CHAIN

Application filed November 27, 1928. Serial No. 322,263.

This invention relates to chains and more particularly to conveyor chains. The high degree of efficiency of modern industrial plants has been largely brought about by the wide spread use of conveying systems in said plants, and by the advances that have been made in the conveying art. Chains of the character of that to which the present invention relates are used in many different relations, as for example, upon bucket conveyors, drag conveyors, and the like. One of the most important fields of use for a chain of this character is in connection with power driven, continuous overhead conveyor systems, wherein the chain connects a series of trolleys running upon a single overhead rail, the articles to be conveyed being suspended from the trolleys. To facilitate the initial installation of the conveyors, and changes in the location of a given run of conveyor chain, as well as to provide for ready repair, it is the common practice to so construct the chain links that they may be readily separated, if necessary.

This separation of the links is effected in some of the most important types of chains by a sliding movement of the side links, with respect to their companion center links, the arrangement being such that the pins may be removed when the links are thus moved endwise with respect to each other.

However, it has been found that sometimes this endwise movement of the links, with respect to each other, will take place accidentally, either when the chains are being handled, before being installed, or where a considerable slack is present in a run of conveyor.

Therefore, a primary object of the present invention is to provide a conveyor chain construction of such a nature that, while it will possess all of the advantages of ready separation of the parts when required, such separation cannot possibly occur accidentally.

It is a further object of the invention to provide such configuration of the parts, at the point of contact between the side and center links, as will permit curvature of the chain in passing around bends, while, at the same time, undue looseness of fit between the center and side links is avoided.

Briefly stated, I accomplish the desired result of providing for the ready separation of the parts by making the center links in two parts, and of such configuration that when the chain is in use the combined width of these two parts is such as to hold the side links apart and into firm engagement with the heads of the connecting pins. Normally, these two parts of the center links are held against endwise movement with respect to each other, by a suitable locking means, and when the chain is to be disconnected, this locking device is removed, and the two parts of the center link are moved endwise with respect to each other, in which shifted position their combined width is so much less than formerly that the side links may move toward each other enough to free the heads of the connecting pins and permit said pins to be moved bodily endwise to a position where they may be disengaged from the side links.

One of the important features of the present invention resides in constructing the two halves of the center link in such manner that they will be interchangeable with the side links. Thus, a single die will serve to make both the side and center links. This not only represents a marked decrease in the cost of manufacture, but it facilitates shipment in that uniform packages may be employed. Furthermore, the users of the chains will not be required to keep so many spare parts on hand, for repair purposes.

Further objects and advantages of the invention will be set forth in the detailed description which follows.

In the drawing:

Fig. 1 is a side elevation of a conveyor chain, constructed in accordance with the invention, and with the parts in operating position, Fig. 2 is a detail view illustrating how the center link is collapsed by longitudinal movement of its two parts with respect to each other, Fig. 3 is a face view of one of the halves of the center link, Fig. 4 is a perspective view of the clip, hereinafter described, Fig. 5 is a perspective view of the bolt, hereinafter described, which constitutes the locking means by which the parts of the center link are held against movement with respect to each other.

Like numerals designate corresponding parts in all of the figures of the drawing.

Figure 1:
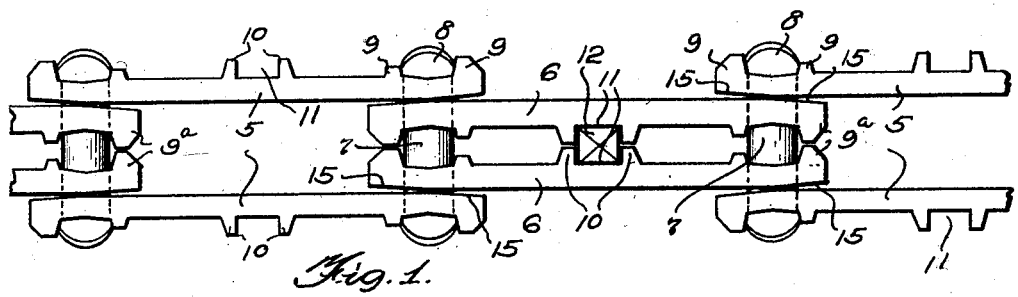

By referring to the drawing, and particularly Fig. 1, it will be seen that the chain of the present invention is composed of side links 5 and center links 6, and that the various links are identical in construction, so that they will be interchangeable. When the links are used as side links the transverse connecting pins 7 have their heads 8 seated between lugs 9, and when the chain is in condition for use, the side links are held apart by the presence of the center links 6, at which time the lugs 9ª which correspond to the lugs 9 of the side links face toward and contact with each other. When the center links are in this position their combined width is such as to hold the side links apart. Each link is further provided, intermediate its ends, with a pair of spaced lugs 10. These lugs perform no function when the links are used as side links, but when the links are used as center links they complementally form an angular recess 11, which receives the angular heads 12 of a bolt 13. After the bolt has been placed in position, as illustrated in Fig. 1, a spring clip 14 is snapped about the bolt and lies between the opposite sides of the respective center links. This clip retains the bolt in position, and the angular heads of the bolt, in turn, prevent endwise movement of the two halves of the center link, with respect to each other. Thus, as long as the locking device constituted by the bolt remains in place, the two halves of the center link will be held against longitudinal movement with respect to each other, and there can be no accidental release of the chain links.

In order to prevent turning of the clip 14 upon the bolt 13, said bolt is provided with angular projections 12ª, upon its heads, which extend between the terminal ends of the clip. Thus, the clip can never work around upon the bolt to a position where its ends face either of the pins 7. The purpose of this is to guard against the possibility that back lash of said pins might knock the clip 14 off of bolt 13, and permit the accidental release of said bolt.

Figure 2:
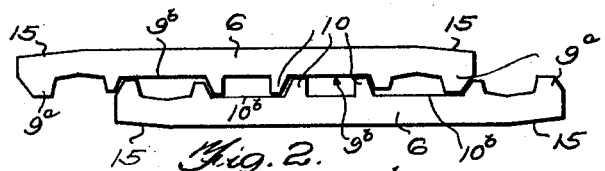
Figure 4:
Figure 3:
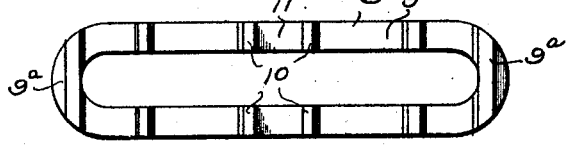
Figure 5:
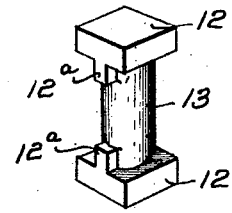

When it is desired to part the chain, the clip 14 is removed from bolt 13, and bolt 13 is moved endwise and out of engagement with the halves of the center link. Then these halves are moved endwise with respect to each other to the position illustrated in Fig. 2. At this time lugs 9ª and lugs 10 enter corresponding recesses 9ᵇ and 10ᵇ, in the confronting faces of the companion half of the center link. The result of this is to so decrease the effective thickness of the collapsed center link that the ends of the side links may be placed toward each other enough to disengage the lugs 9 from the heads 8 of the connecting pins 7, after which said pins may be moved longitudinally toward the center of the side links enough to carry their heads over the inner lugs 9. By then giving the heads of the pins 7 a quarter turn, they are brought to such position as to pass through the slots of the side links and this, of course, parts the chain.

Each link is beveled at its ends, as indicated at 15, for the purpose of permitting the various links to rock to positions of slight angularity with respect to each other. This permits the conveyor chain, as a whole, to travel in an arcuate path, without binding between the parts and, at the same time, without undesirable looseness of fit between the center links and the side links.

Thus, it will be seen that I have combined, in a unitary structure, elements having the following important advantages:

First. The chain may be readily parted when desired but, at the same time, cannot be accidentally parted.

Second. The elements constituting the various links are interchangeable so that all of the link units employed may be made with the same die, and Third. The center links, while such width or thickness as to fill the space between the side links and hold said side links firmly in engagement with the heads of the connecting pins, are capable of moving to positions of decided angularity with respect to the side links.

Figure 6:
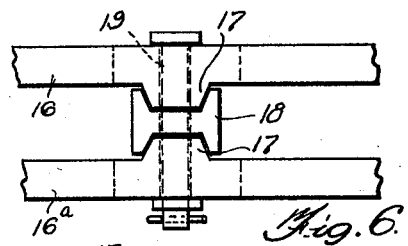
Fig. 6 is a side view illustrating a modified form of locking means for the halves of the center link.
Figure 8:
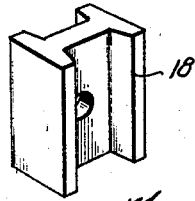
Fig. 8 is a perspective view of the lock of Fig. 6.
Figure 7:
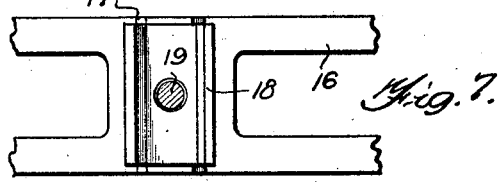
Fig. 7 is a face view of one of the halves of the link in Fig. 6.

In the form of the invention illustrated in Figs. 6, 7 and 8, the two halves 16—16ᵃ of the center links are provided with the abutments 17. An eye-shaped key 18 is complementally engaged with these abutments and held in place by a pin 19. It is clear that this will effectively prevent endwise movement of the two halves of the center link, with respect to each other.

Figure 9:
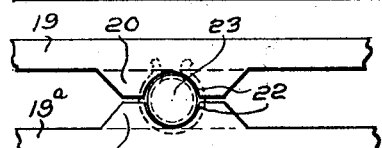
Fig. 9 is a side elevation of a center link showing a further modification of the locking means.
Figure 11:
Fig. 11 is a detail view of a clip, hereinafter described.
Figure 10:
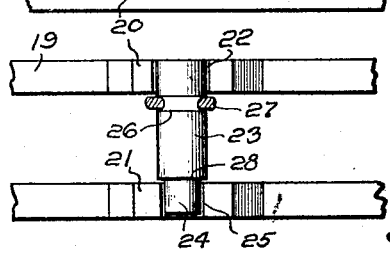
Fig. 10 is a face view of one half of the structure illustrated in Fig. 9.

In the form of the invention illustrated in Figs. 9, 10 and 11, the two halves 19—19ᵃ of the center link are each provided with the abutments 20—21. The opening 22 in the uppermost of these abutments is large enough to permit the passage of a pin 23. This pin has a reduced end 24, adapted to enter recess 25, formed in the lowermost of said abutments. The pin is provided with an annular groove 26 in its length, and after the pin has been put in position a clip 27 is engaged in said annular groove. Movement of the pin outwardly is resisted by clips 27; and movement of the pin inwardly is prevented by the shoulder 28 of the pin. As long as this pin is in position with its opposite ends complementally engaged with the abutments of the two halves of the center link, said halves cannot be moved longitudinally with respect to each other.

Figure 12:
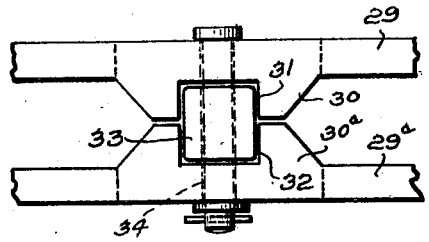
Fig. 12 is a side view of a further modification of the locking device.

In the modified form of locking device, illustrated in Fig. 12, the two halves of the center link, indicated at 29—29ᵃ, are each provided with abutments 30—30ᵃ. These abutments are provided with the confronting recesses 31—32, which complementally receive a block 33, which is angular in cross section. The pin 34 traverses this block, and the halves of the center link and holds the angular block in position. The block takes the thrust and resists endwise movement of the two halves of the link with respect to each other. Thus, there is no tendency to shear off the pin 34.

Figure 14:
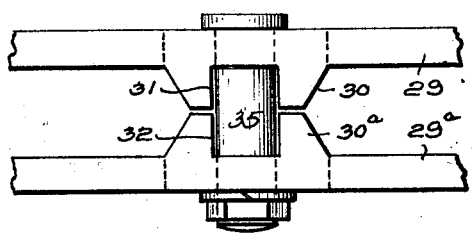
Fig. 14 is a side elevation of a further modification of the locking device.
Figure 13:
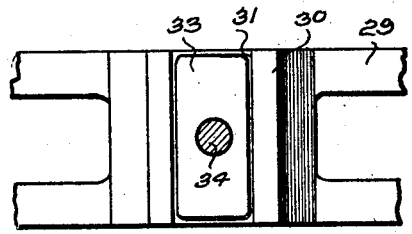
Fig. 13 is a face view of one half of the center link, illustrating the locking device of Fig. 12.
Figure 15:
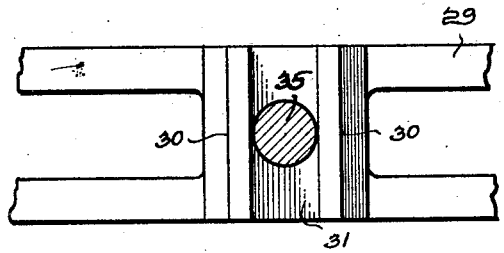
Fig. 15 is a face view of one half of the center link of Fig. 14.
Figure 16:
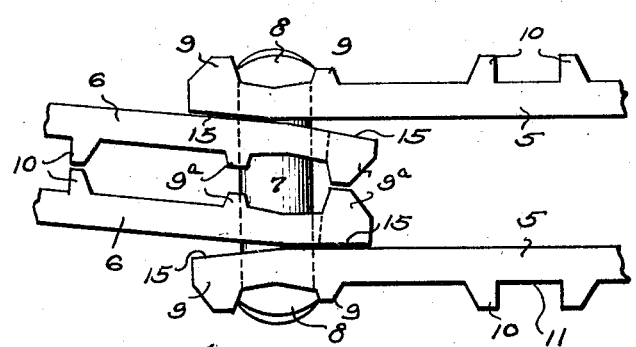
Fig. 16 is a detail view illustrating the center link rocked to an angle with respect to the side link.

In the form of the invention illustrated in Figs. 14 and 15, the structure is much like that illustrated in Figs. 12 and 13, except that in this case the angular block 33 is omitted, and a bolt 35 is passed through the two halves of the center link, to hold these halves against endwise movement with respect to each other.

It will be clear that many ways will suggest themselves to those skilled in the art, for locking the halves of the center link against endwise movement.

Consequently, it is to be understood that the invention is not limited to any particular way of accomplishing this result, nor is it limited in any respect to the particular embodiment which I have chosen for purposes of illustration. Upon the contrary, it is to be understood that the invention includes within its purview whatever changes fairly come within either the terms or the spirit of the appended claims.

Having described my invention, what I claim is:

1. A chain construction comprising side links, center links, and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise with respect to each other, they may nest into each other in such manner as to reduce their effective thickness and permit inward movement of the side links to free the pins, said side links and the halves of the center links being of such uniform design as to be interchangeable.

2. A chain construction comprising side links, center links, and transverse connecting pins, interengaging parts upon the side links and the pins, operative when the side links are thrust outwardly, the center links being made in two halves of a combined thickness to hold the side links in pin-engaging position when the parts are in operative position, the two halves of the center links being so shaped that when they are moved endwise with respect to each other they may nest into each other in such manner as to reduce their effective thickness, and permit inward movement of the side links to free the pins, and an element in addition to the transverse connecting pins which complementally engages and locks the two halves of the center links against endwise movement with respect to each other.

3. A chain construction comprising side links, center links, and transverse connecting pins, interengaging parts upon the side links and the pins operative when the side links are thrust outwardly, the center links being made in two halves of a combined thickness to hold the side links in pin engaging position, when the parts are in operative position, the two halves of the center links being so shaped that when they are moved endwise with respect to each other, they may nest into each other in such manner as to reduce their effective thickness, and permit inward movement of the side links to free the pins, said side links and the halves of the center links being of such uniform design as to be interchangeable, and means for locking the halves of the center links against endwise movement with respect to each other.

4. A chain construction comprising side links, center links and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise with respect to each other, they may nest into each other in such manner as to reduce their effective thickness and permit inward movement of the side links to free the pins, said side links and the halves of the center links being of such uniform design as to be interchangeable, and a locking element complementally engaging the two halves of the center link and preventing endwise movement of said halves, with respect to each other.

5. A chain construction comprising side links, center links and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise, with respect to each other, they may nest into each other in such manner as to reduce their effective thickness and permit inward movement of the side links to free the pins, said side links and the halves of the center links being of such uniform design as to be interchangeable, a locking element complementally engaging the two halves of the center link and preventing endwise movement of said halves, with respect to each other, and means for holding said locking element against movement with respect to said halves.

6. A chain construction comprising side links, center links and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise, with respect to each other, they may nest into each other in such manner as to reduce their effective thickness and permit inward movement of the side links to free the pins, said side links and the halves of the center links being of such uniform design as to be interchangeable, a locking element complementally engaging the two halves of the center link and preventing endwise movement of said halves, with respect to each other, and a clip for engaging said locking element and preventing movement of the same out of engagement with said halves.

7. A chain construction comprising side links, center links, and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise with respect to each other, they may nest into each other in such manner as to reduce their effective thickness and permit inward movement of the side links to free the pins, said side links and the halves of the center links being of such uniform design as to be interchangeable, each of said links being beveled off at its ends upon their outer sides.

8. A chain construction comprising side links, center links, and transverse connecting pins, interengaging parts upon the side links and the pins operative when the side links are thrust outwardly, the center links being made in two halves of a combined thickness to hold the side links in pin-engaging position when the parts are in operative position, the two halves of the center links being so shaped that when they are moved endwise with respect to each other, they may nest into each other in such manner as to reduce their effective thickness and permit inward movement of the side links to free the pins, said links being beveled off at their ends upon their outer sides, as and for the purposes set forth.

9. A chain link element comprising an elongated slotted bar having upon one side face three pairs of lugs, the lugs of one pair lying in spaced relation to each other at approximately the center of the plate, and the remaining pairs of lugs being disposed at the opposite ends of the plate, the said lugs being so positioned that when said elements are used as side links the end lugs serve to engage the transverse pins of the chain, while when the pairs of said elements are used to constitute a center link of the chain said end lugs serve as confronting and contacting abutments to maintain a determined thickness of the center links.

10. A chain link element comprising an elongated slotted bar having upon one side face three pairs of lugs, the lugs of one pair lying in spaced relation to each other at approximately the center of the plate, and the remaining pairs of lugs being so positioned that when said elements are used as side links the end lugs serve to engage the transverse pins of the chain, while when the pairs of said elements are used to constitute a center link of the chain said end lugs serve as confronting and contacting abutments to maintain a determined thickness of the center links, and the central lugs complementally create a pocket for the reception of a locking device by which the two halves of the center links are held against longitudinal movement with respect to each other.

11. A chain link element comprising an elongated slotted bar having upon one side face three pairs of lugs, the lugs of one pair lying in spaced relation to each other at approximately the center of the plate, and the remaining pairs of lugs being so positioned that when said elements are used as side links the end lugs serve to engage the transverse pins of the chain, while when the pairs of said elements are used to constitute a center link of the chain, said end lugs serve as confronting and contacting abutments to maintain a determined thickness of the center links, and the central lugs complementally create a pocket for the reception of a locking device by which the two halves of the center links are held against longitudinal movement with respect to each other, said lugs being so positioned that when the two halves of the center links are moved endwise with respect to each other, the end lugs, upon the one half of the center links nest within the space formed between the center lugs and the end lugs of the other half of the center link, and the central lugs of the first named half of the center link nest within the space between the center lugs and the other end lugs of the remaining half of the center link.

12. A chain construction comprising side links, center links, and transverse connecting pins, said center links being formed in two parts and being made collapsible as to effective width when the said parts are moved with respect to each other, and an element in addition to said pins which complementally engages and locks said parts against such movement to collapsing position, the thickness of the center links when, in non-collapsed position, being such as to hold the side links in locking engagement with the pins.

13. A chain construction comprising a plurality of identical links adapted to serve either as side links or as elements of a two part center link, transverse pins for connecting the center and side links having heads with which the side links are held in locking engagement as long as the center links are in place and of normal width, the parts of the center links being shiftable with respect to each other to a position where they are collapsed as to effective width, and a locking device complementally engaging the parts of the center links to hold them against movement to collapsing position as long as said locking device is in locking position.

In testimony whereof I affix my signature.

JAMES S. DA COSTA.